United States Patent [19]

Hose, Jr. et al.

[11] 4,053,821
[45] Oct. 11, 1977

[54] VOLTAGE MULTIPLIER CIRCUIT

[75] Inventors: R. Kenneth Hose, Jr., Cupertino; Keith Riordan, Sunnyvale; Stephen M. Martin, Pleasanton, all of Calif.

[73] Assignee: Fairchild Camera and Instrument Corporation, Mountain View, Calif.

[21] Appl. No.: 652,442

[22] Filed: Jan. 26, 1976

[51] Int. Cl.² .......................................... H02M 3/155
[52] U.S. Cl. .................................................. 363/60
[58] Field of Search ............ 321/15; 58/23 BA, 50 R; 307/110, 246

[56] References Cited

U.S. PATENT DOCUMENTS

| | | | |
|---|---|---|---|
| 3,790,812 | 2/1974 | Fry | 321/15 |
| 3,824,447 | 7/1974 | Kuwabara | 307/110 |
| 3,919,625 | 11/1975 | Barton | 58/23 BA |
| 3,942,047 | 3/1976 | Buchanan | 321/15 |
| 3,975,671 | 8/1976 | Stoll | 321/15 |
| 4,000,412 | 12/1976 | Rosenthal et al. | 321/15 |
| 4,016,476 | 4/1977 | Morokawa et al. | 321/15 |

OTHER PUBLICATIONS

IEEE Journal of Solid-State Circuits, vol. SC-11, No. 3, pp. 374-378, Figure 5, June, 1976.

Primary Examiner—William H. Beha, Jr.
Attorney, Agent, or Firm—Alan H. MacPherson; Henry K. Woodward; Norman E. Reitz

[57] ABSTRACT

A new and improved voltage multiplier circuit is provided which converts a relatively low voltage to a relatively high voltage without any undesirable voltage drops across any of the constituent components. A plurality of the disclosed voltage multiplier circuits may be cascaded together to increase the multiplied output voltage, wherein each multiplier stage of the cascaded circuits multiplies the input voltage by two.

18 Claims, 7 Drawing Figures

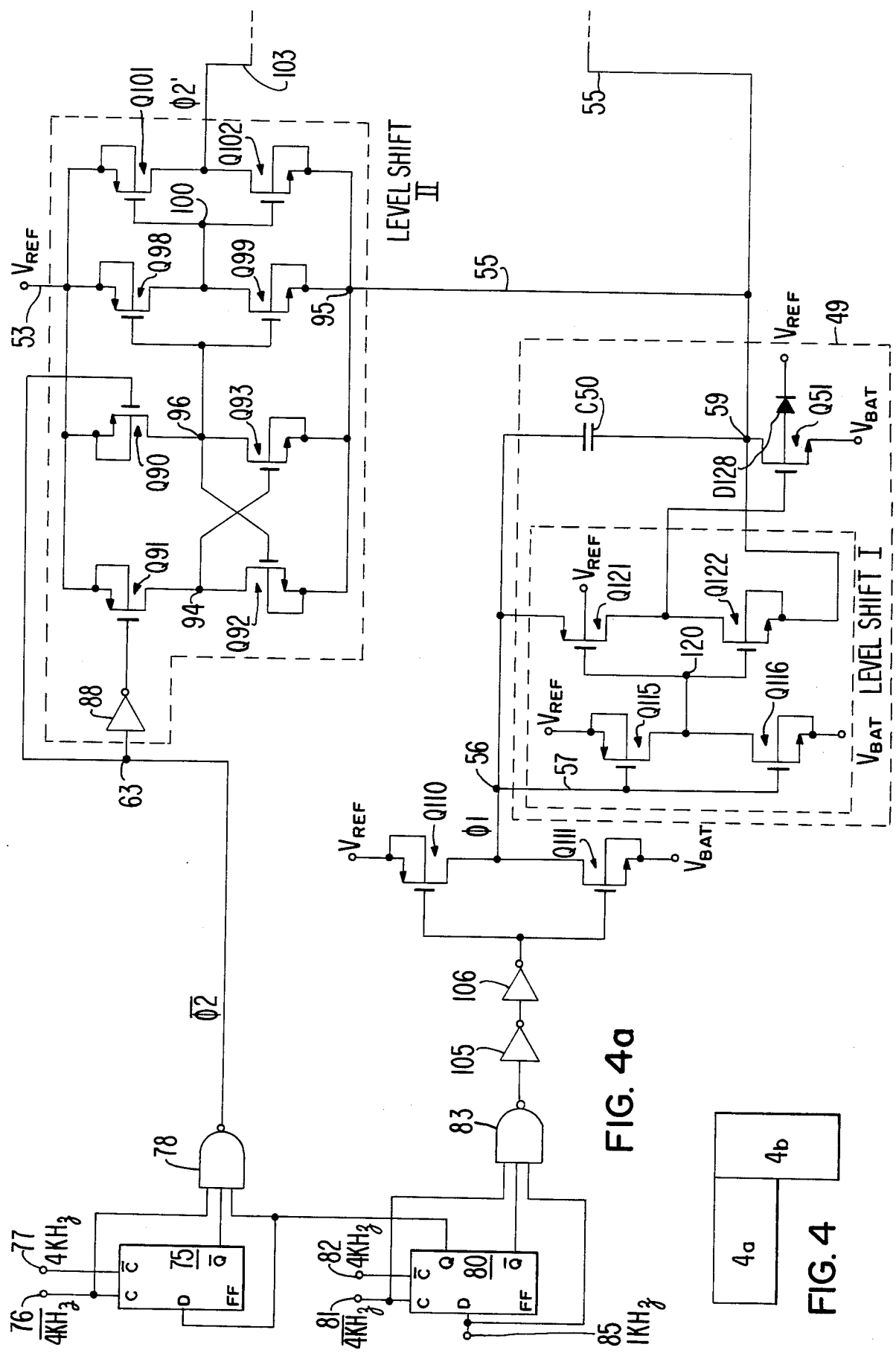

VOLTAGE MULTIPLIER CIRCUIT

BACKGROUND OF THE INVENTION

2. Field of Invention

This invention generally relates to voltage multipliers and more particularly to circuitry for providing a high level supply voltage from a relatively low voltage source used for supplying power to small electronic devices, such as time display circuitry suitable for use in electronic watches.

2. Description of Prior Art

Voltage multipliers in general are well known. A typical well known voltage multiplier employs capacitors and diodes to provide a voltage output which is twice the value of the peak A.C. input voltage. Such prior art devices, as will be described in greater detail hereinbelow, are unsatisfactory for use in low voltage applications because of the loss in voltage dropped across the diode or diodes. A more recent prior art voltage multiplier is described in U.S. Pat. No. 3,815,354 entitled "Electronic Watch," which issued June 11, 1974 to Richard L. Sirocka and David F. Broxterman. Such a prior art voltage multiplier employs transistor switching means, an inductive element, a capacitive element, and a diode; and, operates on the principle of inducing a relatively high voltage across an inductor by rapidly changing the current through the inductor. The output voltage is rectified and "smoothed" by the diode and capacitor. This prior art voltage multiplier is difficult to minitaurize and especially creates a space packaging problem when used in small devices, such as electronic watches, where it is always desirable to eliminate componants external to the integrated circuit.

Another prior art device for voltage multipliers is set forth in an article entitled "CMOS-Circuits for Digital Watches" by James Kerine, which was published in a seminar entitled "Electronic Watches," parts I and II of the 1975 Wescon Professional Program of San Francisco, Sept. 16, 1975.

In FIG. 5 of this article at page 4 thereof, a "Voltage Tripler" circuit is illustrated, which employs CMOS devices to multiply a small input voltage to a relatively high output voltage.

SUMMARY OF THE INVENTION

A voltage multiplier is provided, which comprises a source of a reference clock signal; a pair of reference voltage sources; a first voltage level shift means having a first input coupled to the reference clock signal, and being coupled between each of the pair of reference voltage sources; charge storage means coupled between the reference clock signal and a second input of the first voltage level shift means coupled to the second input of the first voltage level shift means; and, switching means coupled between the second input of the first voltage level shift means and a first of the pair of reference voltage sources, and having a switching input coupled to an output of the first voltage level shift means.

In addition, the voltage multiplier above may be employed in constructing a voltage quadrupler by the addition of a source of a second reference clock signal; a second voltage level shift means having a first input coupled to the second reference clock signal, and a second input coupled to the second input of the first voltage level shift means and an output; a third voltage level shift means having a first input coupled to the output of the second voltage level shift means, a second input coupled to the second input of the first level shift means; a second charge storage means coupled between the output of the second voltage level shift means and an output terminal of the multiplier circuit; and, a second switching means coupled between the output of the converter and the second input of the first and the third voltage level shift means.

The advantages of the present invention reside in the fact that fewer parts external to an integrated circuit employing the present invention are required, which reduces the cost of manufacture; and, the present invention operates at lower voltages without voltage drops as in the prior art devices.

A key feature of the present invention resides in the provision of a voltage multiplier circuit which enables the use of only one battery cell, in for example a digital watch, in lieu of a multiplicity of batteries to provide the necessary output voltage for driving a liquid crystal display.

BRIEF DESCRIPTION OF THE DRAWINGS

FIG. 4 is a unitary diagram illustrating the orientation of sheets 2 and 3 containing FIGS. 4a and 4b, respectively;

FIGS. 4a and 4b illustrate in combination a detailed schematic diagram of the circuit of the present invention; and, FIG. 5 illustrates a timing diagram depicting the operation of the circuit of the present invention.

DETAILED DESCRIPTION

Figure 1:
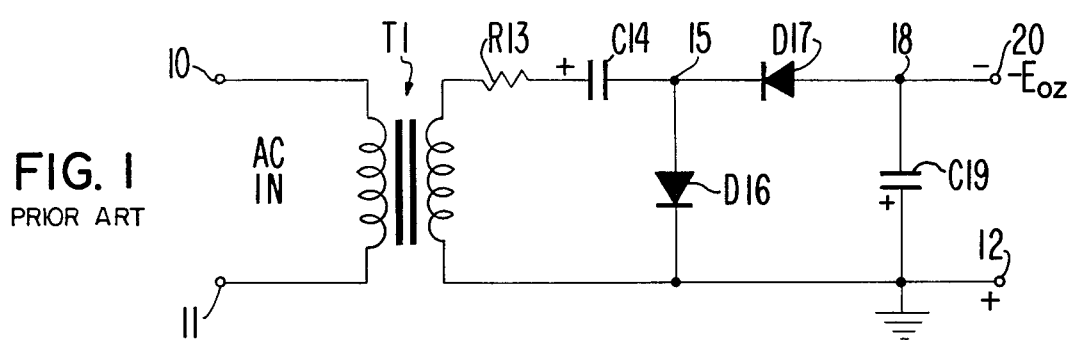
FIG. 1 is a schematic diagram of a prior art voltage level converter.

Referring now to the drawings, and in particular to FIG. 1, a typical prior art voltage multiplier is illustrated. A transformer T1 has primary terminals 10 and 11 coupled to a source of alternating circuit. A first side of the transformer T1 is coupled to ground potential and to an output terminal 12. The second side of the transformer T1 is coupled to one side of a resistor R13. The other side of resistor R13 is coupled to one side of a capacitor C14, and the other side of the capacitor C14 is coupled to a circuit node 15. A diode D16 is coupled between the node 15 and another circuit node 18, wherein the anode of diode D17 is coupled to the node 18. A capacitor C19 is coupled between the node 18 and ground potential. Also, node 18 is coupled to a second output terminal 20.

In operation, during the positive swing of the AC voltage coupled across transformer T1, capacitor C14 charges through the diode D16 to one-half the peak-to-peak voltage of the AC signal. When the AC signal swings negative, the voltage at node 15 drops to a minus value equal to the peak-to-peak voltage of the AC signal and charge is transferred to capacitor C19 through diode D17 so that the voltage on the output terminal 19 will be substantially equal to the peak-to-peak voltage of the AC input signal supplied on terminals 10 and 11. A distinct disadvantage of the prior art circuit illustrated in FIG. 1l is that a voltage drop occurs across the diodes D16 and D17. Accordingly, when such a circuit is employed for low voltage sources within the range of 1.5 volts, the diode voltage drops become critical.

Figure 2:
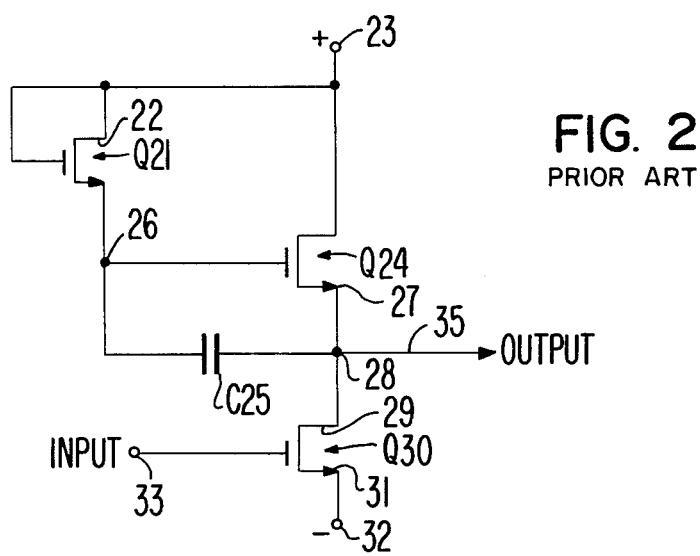
FIG. 2 is a schematic diagram of a more recent prior art voltage level converter.

Referring now to FIG. 2, a more recent prior art voltage multiplier circuit is illustrated, which employs a metal oxide semiconductor (MOS) device to simulate a diode. An n-channel field-effect transistor (FET, and MOS device) Q21 has a drain terminal 22 coupled to a reference voltage terminal 23. The gate terminal of Q21 is coupled to the drain terminal 22, thereby enabling the simulation of a diode. The source terminal of Q21 is coupled to the gate terminal of another n-channel MOS FET Q24, and to one side of a capacitor C25 at a circuit node 26. The drain terminal of Q24 is coupled to the terminal 23. The source terminal 27 of Q24 is coupled to the second side of the capacitor C25 at a circuit node 28. The drain terminal 29 of another n-channel MOS FET Q30 is coupled to the node 28, and the source terminal 31 of Q30 is coupled to a second reference voltage on a terminal 32. The gate terminal of Q30 is coupled to an input terminal 33. The output from this voltage converter circuit is provided at node 28 on a line 35.

In operation, assume that a positive 10 volts is supplied to terminal 23, ground potential applied at terminal 32, and an oscillatory input signal is supplied on terminal 33. When the oscillatory input signal goes positive, Q30 will turn ON, causing the output voltage on line 35 to drop to ground potential. At the same time, Q21 is ON and capacitor C25 will charge up to a value within a device threshold voltage drop of the voltage on node 23. Thus, capacitor C25 will charge up to approximately 8 volts, assuming that the device threshold voltage drop is equal to approximately 2 volts for the n-channel MOS FET devices employed herein. The voltage on node 26 is now approximately 8 volts, which will turn Q24 ON. When the input signal on terminal 33 drops to ground potential, Q30 turns OFF and the output voltage increases in value since Q24 is ON. The positive voltage on node 26 becomes increasingly more positive since the voltage across C25 cannot change instantaneously. As node 26 rises above 8 volts, the voltage on the gate of Q24 will likewise become increasingly more positive up to a maximum of about 18 volts. This increase in voltage on the gate of Q24 will cause the output voltage on line 35 to rise to plus 10 volts. The voltage on node 26 will increase to a value higher than the supply voltage on terminal 23. Thus, this circuit is a voltage multiplier. Usually the current available at node 26 is very small, unless C25 is quite large, and the transistor device geometries are relatively large.

A disadvantage of this circuit is that there will always be a voltage drop across Q21. This voltage drop is critical in devices having a supply voltage of approximately 1.5 volts. If Q21 could be switched from a saturated mode of operation to an ohmic mode of operation during each cycle of the input clock signal, then the voltage on node 26 could rise to a value substantially equal to twice the supply voltage on node 23.

The voltage multiplier of the present invention overcomes the problem of the prior art circuit described above and shown in FIG. 2 by providing voltage level shift means which switch a transistor corresponding to Q21 from one mode of operation to another during each cycle of an input clock signal.

Figure 3:
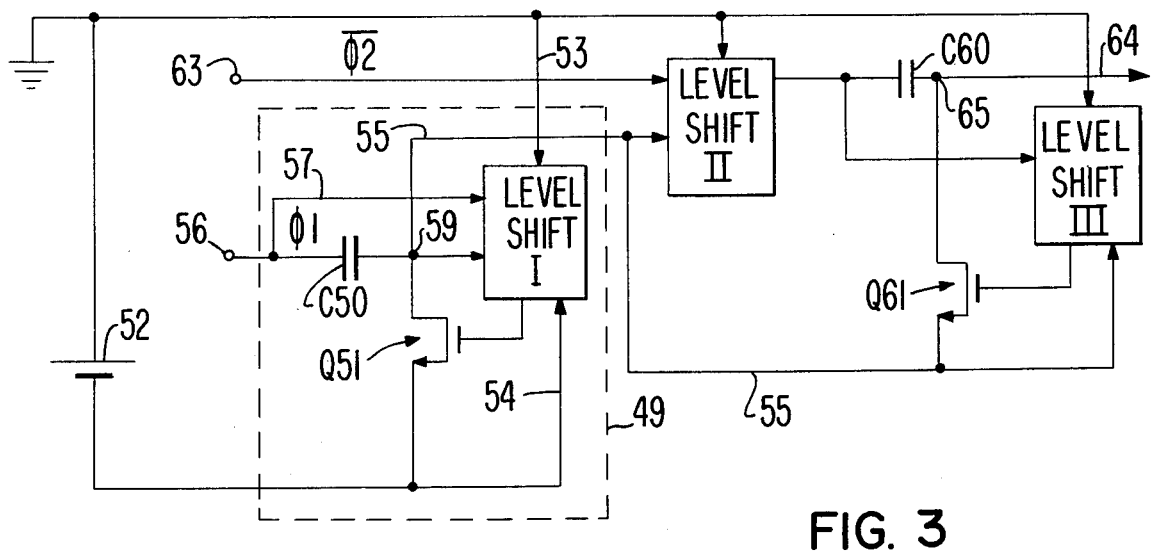
FIG. 3 is a clock diagram of the voltage level converter of the present invention.

Referring now to FIG. 3, a block diagram of an exemplary voltage multiplier of the present invention is illustrated. A voltage doubler circuit 49, blocked out by dashed lines, comprises a voltage level shift I, a capacitor C50 and a n-channel MOS FET Q51. A battery cell 52, providing typically 1.5 volts, is coupled across voltage input terminals 53 and 54 of level shift I. The positive plate of cell 52 is coupled to ground potential ($V_{REF}$), thereby providing approximately minus 1.5 volts on input terminal 54. The output of voltage doubler 49 is supplied on a line 55, and is substantially twice the input voltage of 1.5 volts, or 3.0 volts.

A clock signal, designated herein as 01, is supplied on a terminal 56, which terminal is coupled to a first input of level shift I through capacitor C50, and to a second input thereof by means of a line 57. The drain terminal of Q51 is coupled to the first input of level shift I, and to the second side of capacitor C50 at a circuit node 59. The source terminal of Q51 is coupled to the negative side of cell 52, and the gate terminal thereof is coupled to an output of level shift I. The output line 55 is coupled to the circuit node 59.

The voltage doubler 49 is readily adapted to a voltage quadrupler by the cascaded addition of level shifts II and III, a capacitor C60, and another n-channel MOS FET Q61. A second clock signal, designated herein as $\overline{02}$, is supplied on a terminal 63, which is coupled to a first input of level shift II. The $\overline{02}$ clock signal is non-overlapping with the 01 clock signal. The output line 55 from the voltage doubler 49 is coupled to a second input of level shift II and to a first input of level shift III. The ground potential connection to the positive side of cell 52 is also provided at a third input of level shift II, and at a second input of level shift III.

The output of level shift II is coupled to a third input of level shift III, and to one side of the capacitor C60. The second side of capacitor C60 is coupled to the drain terminal of Q61 and to an output line from the voltage quadrupler at a circuit node 65. The source terminal of Q61 is coupled to the line 55, and the gate terminal thereof is coupled to the output of level shift III.

In operation, the two non-overlaping clock signals 01 and $\overline{02}$ are generated externally from the circuit shown in FIG. 3, which signals are typically positive going with one-eighth duty cycle at 1,024 Hz, and have approximately 1.5 volt logic swings. During the time that 01 clock signal is at a high level (zero volts) the gate of Q51 is returned to the most positive voltage level, which turns Q51 "ON", and node 59 charges to approximately minus 1.5 volts with respect to the reference voltage of zero volts. When the 01 signal goes to a logic zero (−1.5 volts), the voltage on node 59 will go to minus 3.0 volts due to the charge on capacitor C50. At this time the gate of Q51 is returned to the potential of that on node 59, turning OFF Q51, so that the charge on the capacitor C50 is held at minus 3.0 volts. This is accomplished by level shift I.

Next, the $\overline{02}$ timing signal goes to a logic 1 (zero volts) and level shift II converts this signal into a positive-going signal which swings between minus 3.0 volts and the reference voltage of zero volts. This new signal is referred to herein as 02', and has the same timing as the $\overline{02}$ signal except that it has a larger amplitude. At this time the gate of Q61 is returned to the most positive potential (zero volts) thereby turning it "ON." The capacitor C60 charges through Q61 to a potential of minus 3.0 volts. When the clock signals $\overline{02}$ and 02' go negative, the gate of Q61 is returned to the potential of that on node 65, thereby turning OFF Q61. The voltage on node 65 will swing to a potential of minus 6.0 volts, due to the charge stored by the capacitor C60. The gate terminal of Q61 is returned to the potential of that on node 65 by the level shift III. In summary, voltage level shifts I and II insure that the gates of Q51 and Q61 are simulating the reverse-biased diode characteristic. This, as will be explained in greater detail hereinbelow, overcomes the voltage drop problems of the prior art circuits discussed above.

Figure 4B:
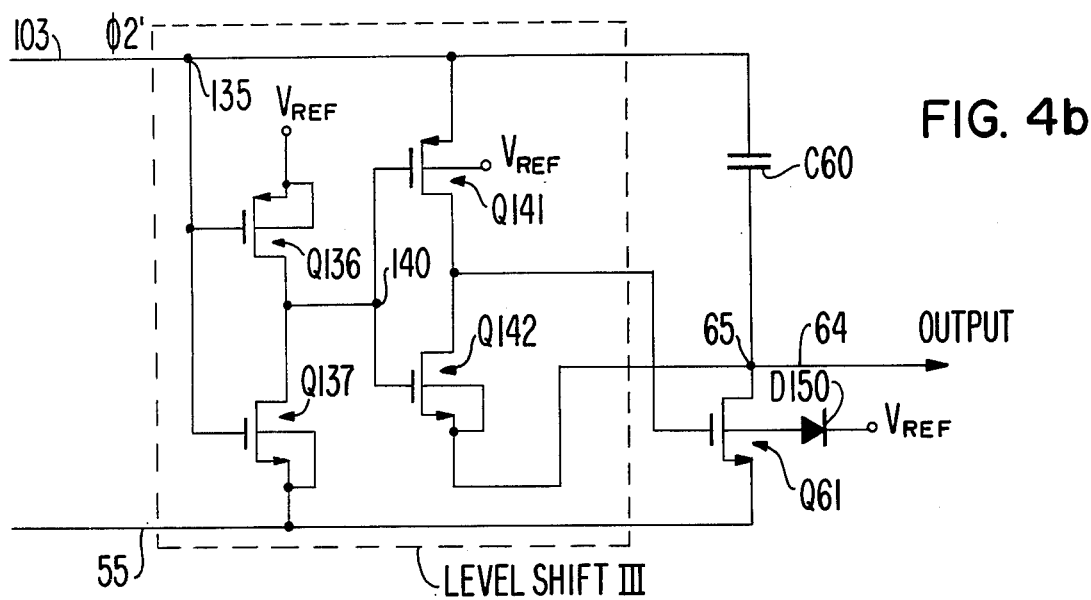

Referring now to FIG. 4, a unitary diagram of the orientation of the sheets including FIGS. 4a and 4b is illustrated. FIGS. 4a and 4b illustrate a schematic diagram of the voltage quadrupler shown in FIG. 3, including the voltage multiplier 49 of the present invention.

CLOCK and $\overline{\text{CLOCK}}$ inputs of a flip flop 75 are coupled to a 4KHz and the inverse thereof, clock signals supplied on terminals 76 and 77, respectively. The $\overline{\text{4KHz}}$ signal supplied on the terminal 76 is also supplied to the first of three inputs of a NAND gate 78. The D input of the flip flop 75 is coupled to a second input of the NAND gate 78, and to the Q output of a second flip flop 80. The Q output of the flip flop 75 is coupled to a third input of the NAND gate 78. The CLOCK and $\overline{\text{CLOCK}}$ inputs of the flip flop 80 are coupled to the same 4KHz signal, and the inverse thereof, supplied on terminals 81 and 82, respectively. The $\overline{\text{4KHz}}$ input signal supplied on the terminal 81 is also supplied to the first of three inputs of a second NAND gate 83. The D input of flip flop 80 is coupled to a 1 KHZ signal supplied on a terminal 85, and to a second input of the NAND gate 83. The $\overline{\text{Q}}$ output of flip flop 80 is coupled to the third input of the NAND gate 83. The use of 4KHz, $\overline{\text{4KHz}}$ and 1KHz signals to produce the desired frequency of the non-overlapping clock signals 01 and $\overline{\text{02}}$ is by way of example only and not of limitation.

The output of the NAND gate 78 is coupled to the terminal 63, which is coupled to the input of the inverter 88 within level shift II, and to the gate terminal of a p-channel MOS FET Q90. The output of the inverter 88 is coupled to the gate terminal of another p-channel MOS FET Q91. Thus, the $\overline{\text{02}}$ clock signal is supplied to the gate of Q90, and the inverse thereof (02) is supplied to the gate Q91. The source terminals of Q90 and Q91 are coupled to the reference voltage $V_{REF}$ on the terminal 53, and the drain terminals of these MOS FETS are coupled to the drain terminal of an n-channel MOS FET Q92, and a gate terminal of another p-type MOS FET Q93 at a circuit node 94. In a similar manner, the drain terminal of Q90 is coupled to the drain terminal of Q93 and to the gate terminal of Q92 at a circuit node 96, thereby forming a cross-coupled bistable circuit comprising Q92 of Q93, which are loaded by Q91 and Q90, respectively. The substrates of Q92 and Q93 are coupled to the source terminals thereof. The source terminals of Q92 and Q93 are coupled together and this connection is coupled to a circuit node 95. The bistable circuit converts the 1.5 volt level swing of the $\overline{\text{02}}$ clock signal to a 3 volt level swing.

Circuit node 96 is coupled to both gate terminals of a complimentary pair of MOS FETS Q98 and Q99, which form a CMOS inverter. The substrates of Q98 and Q99 are also coupled to the source terminals thereof. The source terminal of Q98 is also coupled to the reference voltage terminal 53. The source terminal of Q99 is coupled to the circuit node 95. The drain terminals of Q98 and Q99 are connected together and this connection is coupled to a circuit node 100. Node 100 is also connected to both gate terminals of a pair of complimentary MOS FEST Q101 and Q102, which form a CMOS inverter. The substrates of Q101 and Q102 are also coupled to the source terminals thereof. The source terminals of Q101 is also coupled to the reference voltage terminal 53. The source terminals of Q102 is coupled to the node 95. The drain terminals of Q101 and Q102 are connected together and this connection is coupled to a line 103, which transmits the 02' signal.

The output of the NAND gate 83 is coupled to the input of an inverter 105, and the output of the inverter 105 is coupled to the input of a second inverter 106. The output of the inverter 106 is coupled to the gate terminals of a pair of complementary MOS FETS Q110 and Q111, which form a CMOS inverter. The substrates of Q110 and Q111 are coupled to the source terminals thereof. The source terminal of Q110 is also coupled to the reference voltage $V_{REF}$ and the source terminal of Q111 is coupled to the reference voltage $V_{BAT}$. The CMOS inverter comprising Q110 nd Q111 is used to buffer the 01 clock signal up to a stronger signal than used elsewhere in the circuit to supply sufficient charging current to the capacitor C50. The drain terminals of Q110 and Q111 are connected together and this connection is coupled to the terminal 56.

Terminal 56 is coupled to both gate terminals of another pair of complementary MOS FETS Q115 and Q116. The substrates of Q115 and Q116 are coupled to the source terminals thereof. The source terminal of Q115 is coupled to the reference voltage $V_{REF}$. The source terminal of Q116 is coupled to the reference voltage $V_{BAT}$. The drain terminals of Q115 and Q116 are connected together, and this connection is coupled to a circuit node 120. Node 120 is coupled to both gate terminals of another pair of complementary MOS FETS Q121 and Q122. The substrate of Q121 is coupled to $V_{REF}$, and the substrate of Q122 is coupled to the source terminal thereof. The source terminal of Q121 is coupled to the terminal 56, and the source terminal of Q122 is coupled to the circuit node 59. The capacitor C50 is coupled between the terminal 56 and the node 59.

The drain terminals of Q121 and Q122 are connected together, and this connection is coupled to the gate terminal of Q51. The source terminals of Q51 is coupled to the reference voltage $V_{BAT}$. The drain terminal of Q51 is coupled to the reference voltage $V_{REF}$ through a parasitic diode D128, wherein the anode of diode D128 is coupled to the substrate of Q51. Thus, the substrate of Q51 actually floats in that there is no direct connection to a power supply. This is necessary to assure that the voltage on node 59 is not clamped to within a diode voltage drop of the reference voltage $V_{BAT}$ when the voltage on node 59 swings negative.

The node 59 is coupled to node 95 within the level shift II by means of the line 55. Also, node 59 is coupled to level shift III shown in FIG. 4b by means of the same line 55.

Referring now to FIG. 4b, wherein level shift III is illustrated, line 103 from level shift II (FIG 4a) is coupled to a node 135. Node 135 is coupled to both gate terminals of a pair of complimentary MOS FETS Q136 and Q137, and the substrates of Q136 and Q137 are coupled to the source terminals thereof. The source terminal of Q136 is coupled to the reference voltage $V_{REF}$, and the source terminal of Q137 is coupled to the line 55. The drain terminals of Q136 and Q137 are connected together, and this connection is coupled to a circuit node 140. Node 140 is coupled to both gate terminals of another pair of complimentary MOS FETS Q141 and Q142. The substrate of Q141 is coupled to the reference voltage $V_{REF}$, and the substrate of Q142 is coupled to the source terminal thereof. The source terminals of Q141 is coupled to the node 135, and the source terminal of Q142 is coupled to the node 65. The drain terminals of Q141 and Q142 are connected together, and this connection is coupled to the gate terminal of Q61. The source terminal of Q61 is coupled to the line 55, and the substrate of Q61 is coupled to the reference voltage $V_{REF}$ through a parasitic diode D150, wherein the anode of D150 is coupled to the substrate of Q61. The diode D150 shown coupled to the substrate of Q61 causes the substrate thereof to float in the same manner as described above with reference to diode D128. The capacitor C60 is coupled between the node 135 and the node 65, and the output of the voltage multiplier circuit is supplied on the line 64, which is coupled to the node 65 as described hereinabove.

The entire circuit shown in FIGS. 4a and 4b, except for capacitors C50 and C60, may be integrated into a single semiconductor chip, which may include other circuitry employing the voltage multiplier. The capacitors C50 and C60 are impractical to integrate, thus they are provided externally. Hence, the voltage multiplier of the present invention only requires sufficient space for the capacitors when used in conjunction with an integrated circuit package such as a digital watch module. Accordingly, a savings of packaging space is provided over the prior art voltage multipliers which employ inductors in addition to capacitors.

Figure 5:
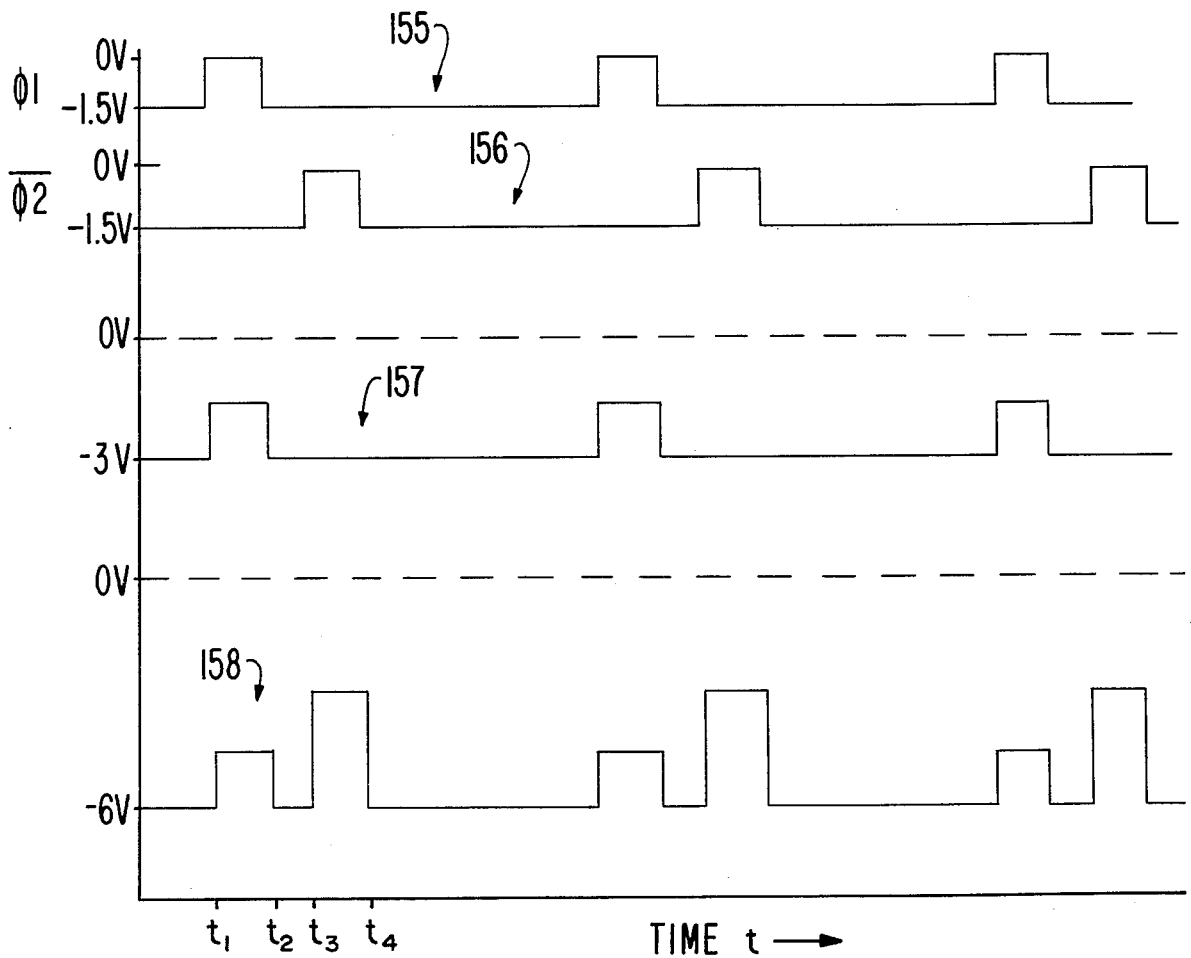

The operation of the circuit illustrated in FIGS 4a and 4b will be more fully understood following a description of the timing diagram illustrated in FIG 5. Waveform 155 illustrates the 01 signal supplied to the terminal 56, and waveform 156 illustrates the $\overline{02}$ signal supplied at the output of the NAND gate 78 to the terminal 63 at the input of level shift II. Note that the 01 and $\overline{02}$ clock signals are positive-going clock signals which swing between minus 1.5 volts and 0 volts, and which ae out of phase and non-overlapping with one another. Waveform 157 illustrates the voltage appearing on the node 59 during operation of the circuit of the present invention. Note that waveform 157 is also a positive-going clock signal which swings from minus 3.0 volts to approximately minus 1.5 volts., and which is in phase with the 01 signal (waveform 155). Waveform 158 illustrates the voltage appearing on the node 65 during operation, and comprises two positive-going signal portions which have a maximum negative extremity of minus 6 volts, wherein one portion is in phase with the 01 clock signal (waveform 155) and the second more positive swinging portion is in phase with the $\overline{02}$ clock signal (waveform 156).

It is noted that the voltage waveform 158 is not a direct current, but alternates in amplitude. It is, of course, possible to rectify this alternating signal and provide direct current. However, when the voltage multiplier is integrated into digital watches which employ liquid crystal displays, then an alternating signal is satisfactory. That is, liquid crystal displays operate on the effective value of the driving voltage, and are not affected by voltage supply transients.

It is noted in the description of the illustrated embodiment that the reference voltage $V_{REF}$ is ground potential, and is referred to herein as a "positive" or "logic 1" value; and, the reference voltage $V_{BAT}$ is a minus value, and is referred to herein as a "negative" or "logic 0" value. In operation, assume that the 01 clock signal is at a positive voltage level (time $t_1$, FIG. 5), or at the $V_{REF}$ voltage level of 0 volts. Transistors Q110 and Q121 turn ON, and Q111 and Q122 turn OFF. Thus, transistor Q51 is turned ON, and capacitor C50 charges through Q110 and Q51. The duration of the positive portion of the 01 clock signal is sufficiently long compared to the charge time of C50 so as to allow C50 to charge up to the full supply voltage of minus 1.5 volts.

Next, the 01 clock signal drops to a logical zero, or minus 1.5 volts (time $t_2$, FIG. 5), which switches the inverter comprising Q115 and Q116, so that node 120 goes to a logical one level, or zero volts. As soon as node 120 goes to a logical one level, Q121 turns OFF and Q122 turns ON. When Q122 turns ON, the voltage on the gate of Q51 is returned to the voltage level present on node 59. Thus, Q122 acts like a switch that shorts node 59 to the gate of Q51. This is an important feature of the present invention since it is assured that Q51 will be turned OFF as the voltage on the node 59 goes more negative than that of $V_{BAT}$. Thus, the charge presently held by C50 cannot discharge through Q51, and the voltage on node 59 will be the most negative possible excursion without any undesirable voltage drops as in the prior art devices.

In other words, without the return between the source terminal of Q122 and node 59 an effective positive voltage would be present on the gate terminal of Q51 as node 59 goes more negative than $V_{BAT}$. This would discharge C50 to $V_{BAT}$ through Q51, which would limit the maximum possible negative excursion on node 59 to a device threshold voltage drop more negative than that of $V_{BAT}$. This is the very problem, as stated hereinabove, with the prior art device shown in FIG. 2.

At this time, minus 3 volts is present on the node 59, which is coupled to node 95 in level shift II by means of line 55. It is pointed out at this juncture of the description that the minus 3 volts supplied in line 55 constitutes the output of voltage doubler 49. The minus 3 volts applied at node 95 constitutes the negative supply voltage for level shift II.

At time $t_3$ (FIG. 5) the 02 clock signal goes to a positive value (zero volts herein), which is applied at the gate terminal of Q90, thereby holding Q90 OFF. The voltage at the output of the inverter 88 will be at a negative value (minus 1.5 volts) when the 02 clock signal is at a positive value. This negative voltage is applied at the gate terminal of Q91, thereby turning ON this transistor which pulls node 94 up to the positive voltage level of $V_{REF}$. Transistor Q93 turns ON, which pulls node 96 down to the minus 3 volt level present on the node 95. This minus 3 vols present on node 96 is buffered by the two inverters comprising Q98 and Q99, and Q101 and Q102, respectively. The output signal supplied on the line 103 is the 02' clock signal, which is in timing synchronization with the 02 clock signal but swings between minus 3 volts and the ground potential of $V_{REF}$.

Referring now to FIG. 4b, while continuing with the description of the operation, the 02' clock signal is supplied to the node 135, and the minus 3 volts from voltage doubler 49 is provided on the line 55. When the 02 clock signal goes positive (zero volts), transistor Q137 will turn ON, which provides minus 3 volts on the node 140. Transistor Q141 turns ON, which applies the $V_{REF}$ potential at the gate of the transistor Q61. At this time Q61 turns on, which allows capacitor C60 to charge through Q61 from the minus 3 volts present on line 55.

At this time, minus 3 volts is present on the node 59, which is coupled to node 95 in level shift II by means of line 55. It is pointed out at this juncture of the description that the minus 3 volts supplied on line 55 constitutes the output of voltage doubler 49. The minus 3 volts applied at node 95 constitutes the negative supply voltage for level shift II.

At time $t_3$ (FIG. 5) the 02 clock signal goes to a positive value (zero volts herein), which is applied at the gate terminal of Q90, thereby holding Q90 OFF. The voltage at the output of the inverter 88 will be at a negative value (minus 1.5 volts) when the 02 clock signal is at a positive value. This negative voltage is applied at the gate terminal of Q91, thereby turning ON this transistor which pulls node 94 up to the positive voltage level of $V_{REF}$. Transistor Q93 turns ON, which pulls node 96 down to the minus 3 volt level present on the node 95. This minus 3 volts present on node 96 is buffered by the two inverters comprising Q98 and Q99, and Q101 and Q102, respectively. The output signal supplied on the line 103 is the 02' clock signal but swings between minus 3 volts and the ground potential of $V_{REF}$.

Referring now to FIG. 4b, while continuing with the description of the operation, the 02' clock signal is supplied to the node 135, and the minus 3 volts from voltage doubler 49 is provided on the line 55. When the 02 clock signal goes positive 0 volts), transistor Q137 will turn ON, which provides minus 3 volts on the node 140. Transistor Q141 turns ON, which applies the $V_{REF}$ potential at the gate of the transistor Q61. At this time Q61 turns on, which allows capacitor C60 to charge through Q61 from the minus 3 volts present on line 55.

When the 02 clock signal goes to minus 1.5 volts (time $t_4$, FIG. 5), the 02' signal drops to minus 3 volts. Thus, Q141 will turn OFF and Q142 will turn ON, which returns the voltage at the gate terminal of Q61 to that present on node 65. Since the 02' clock signal is going negative, the voltage on the output line 64 goes negative to minus 6 volts as shown by waveform 158 (FIG. 5).

Accordingly, a voltage multiplier has been shown which converts a relatively low voltage to a relatively high voltage without any undesirable voltage drops across any components thereof. While the above detailed description of the illustrated embodiment of the present invention has been described with particularity, it is understood that various modifications, alternate constructions and equivalents may be employed without departing from the true spirit and scope of the invention. Therefore, the above description and illustrations should not be construed as limiting the scope of the invention which is solely defined by the appended claims.

What we claim is:
1. A voltage multiplier circuit comprising:
    a source of a reference clock signal;
    a voltage source;
    a pair of cascaded inverters forming a first voltage level shift means, a first of said pair of inverters being coupled between said voltage source and ground potential, and having an input thereof coupled to said reference clock signal and an output coupled to an input of the second of said pair of cascaded inverters, said second inverter being coupled between said reference clock signal and an output of the voltage multiplier circuit;
    charge storage means coupled in parallel with said second inverter; and,
    switching means coupled between said output of the multiplier circuit and said voltage source, and having a switching input coupled to an output of said second inverter.

2. A voltage multiplier circuit as in claim 1 further characterized by said pair of cascaded inverters each comprising a complementary pair of MOS field effect transistors.

3. A voltage multiplier circuit as in claim 1 further characterized by said switching means comprising a field effect transistor.

4. A voltage multiplier circuit comprising:
    a source of a pair of reference clock signals;
    a voltage source;
    a pair of cascaded inverters forming a first voltage level shift means, a first of said pair of inverters being coupled between said voltage source and ground potential, and having an input thereof coupled to a first of said reference clock signals and an output coupled to an input of the second of said pair of cascaded inverters, said second inverter being coupled between said first reference clock signal and an output of said first voltage level shift means;
    first charge storage means coupled in parallel with said second inverter;
    first switching means coupled between said output of said first voltage level shift means and said voltage source, and having a switching input coupled to an output of said second inverter;
    second voltage level shift means having a first input coupled to a second of said referenced clock signals, a second input coupled to said output of said first voltage level shift means, and an output;
    third voltage level shift means having a first input coupled to said output of said second voltage level shift means, a second input coupled to said output of said first voltage level shift means;
    second charge storage means coupled between said output of said second voltage level shift means and an output terminal of said multiplier circuit; and,
    second switching means coupled between said output terminal of said multiplier circuit and said second input of said third voltage level shift means, and having a switching input coupled to an output of said third voltage level shift means.

5. A voltage multiplier circuit as in claim 4 further characterized by said second voltage level shift means comprising a bistable circuit means and a second pair of cascaded inverters, wherein an input of said bistable circuit means is coupled to said first input of said second voltage level shift means, an output of said bistable circuit means is coupled to an input of a first of said pair of cascaded inverters, and an output of the second of said pair of cascaded inverters is coupled to said output of said second voltage level shift means.

6. A voltage multiplier circuit as in claim 5 wherein said pair of cascaded inverters each comprise a complementary pair of MOS field-effect transistors.

7. A voltage multiplier circuit as in claim 5 further characterized by said bistable circuit means comprising a cross-coupled pair of field-effect transistors.

8. A voltage multiplier circuit as in claim 7 further characterized by said bistable circuit means including a second pair of field-effect transistors coupled to respective ones of said cross-coupled pair of field-effect transistors.

9. A voltage multiplier circuit as in claim 8 further characterized by said second voltage level shift means including a third inverter having an input coupled to said second reference clock signal, and an output coupled to the gate terminal of a first of said second pair of field effect transitors.

10. A voltage multiplier circuit as in claim 9 further characterized by said second reference clock signal being coupled to the gate terminal of a second of said second pair of field-effect transistors, whereby said second reference clock signal and the complement thereof at the output of said third inverter

11. A voltage multiplier circuit as in claim 5 further characterized by said second pair of cascaded inverters being coupled between said reference voltage source and said output of said first voltage level shift means. control switching of said bistable circuit means.

12. A voltage multiplier circuit as in claim 4 further characterized by said third voltage level shift means comprising a third pair of cascaded inverters, wherein an input of a first of said third pair of cascaded inverters is coupled to said output of said second voltage level shift means, and the output of a second of said third pair of cascaded inverters is coupled to said output of said third voltage level shift means.

13. A voltage multiplier circuit as in claim 12 further characterized by a first of said third pair of cascaded inverters being coupled between a second of said reference voltage sources and said output of said first voltage level shift means, and a second of said third pair of cascaded inverters being coupled between said output of said second voltage level shift means and said output of said voltage multiplier.

14. A voltage multiplier as in claim 12 further characterized by the output of a second of said third pair of cascaded inverters being coupled to said switching input of said second switching means.

15. A voltage multiplier circuit as in claim 12 further characterized by said third pair of cascaded inverters each comprising a complementary pair of MOS field-effect transistors.

16. A voltage multiplier circuit as in claim 24 further characterized by said second switching means comprising a field-effect transistor.

17. A voltage multiplier circuit as in claim 4 wherein said charge storage means each comprise a capacitor.

18. A voltage multiplier circuit as in claim 4 wherein said reference clock signals are non-overlapping.

* * * * *